(12) United States Patent
Adams

(10) Patent No.: US 11,708,827 B2
(45) Date of Patent: Jul. 25, 2023

(54) CONTROL OF A HIGH-PRESSURE COMPRESSOR

(71) Applicant: Nel Hydrogen A/S, Herning (DK)

(72) Inventor: Joshua Andrew Adams, Herning (DK)

(73) Assignee: NEL HYDROGEN A/S, Herning (DK)

( * ) Notice: Subject to any disclaimer, the term of this patent is extended or adjusted under 35 U.S.C. 154(b) by 508 days.

(21) Appl. No.: 16/630,455

(22) PCT Filed: Apr. 20, 2018

(86) PCT No.: PCT/DK2018/050075
§ 371 (c)(1),
(2) Date: Jan. 12, 2020

(87) PCT Pub. No.: WO2019/011384
PCT Pub. Date: Jan. 17, 2019

(65) Prior Publication Data
US 2021/0148354 A1    May 20, 2021

(30) Foreign Application Priority Data
Jul. 13, 2017    (DK) .......................... PA 2017 70570

(51) Int. Cl.
*F04B 45/053*    (2006.01)
*F04B 49/00*    (2006.01)
(Continued)

(52) U.S. Cl.
CPC ........ *F04B 45/0533* (2013.01); *F04B 49/002* (2013.01); *F04B 43/0081* (2013.01);
(Continued)

(58) Field of Classification Search
CPC .............. F04B 45/0533; F04B 45/0081; F04B 45/067; F04B 49/02; F17C 7/00; F17C 2227/0157
See application file for complete search history.

(56) References Cited

U.S. PATENT DOCUMENTS 1,563,166 A    11/1925    Corblin
2,597,724 A    5/1952    Gratzmuller
(Continued)

FOREIGN PATENT DOCUMENTS

DE    3704588 A1    8/1988
DE    102010060532 A1    5/2012
(Continued)

OTHER PUBLICATIONS

International Search Report for corresponding application PCT/DK2018/050075 filed Apr. 20, 2018; dated Jun. 14, 2018.
(Continued)

*Primary Examiner* — Kenneth J Hansen
(74) *Attorney, Agent, or Firm* — Cantor Colburn LLP

(57) ABSTRACT

A high-pressure compressor having a hydraulic system and a gas chamber, where the hydraulic system includes a reservoir, connected to a hydraulic fluid chamber by a hydraulic flow path and a pump assembly positioned in the hydraulic flow path, and the compressor furthermore includes a control element controlling the flow of hydraulic fluid in the hydraulic flow path and thereby the pressure in the hydraulic fluid chamber, where the control element and the pump assembly is configured for controlling the pressure of hydraulic fluid in the hydraulic fluid chamber when the compressor is not in operation.

15 Claims, 3 Drawing Sheets

(51) Int. Cl.
  *F04B 43/067* (2006.01)
  *F04B 43/00* (2006.01)
  *F17C 7/00* (2006.01)
(52) U.S. Cl.
  CPC ......... *F04B 43/067* (2013.01); *F04B 2205/18* (2013.01); *F05B 2270/301* (2013.01); *F17C 7/00* (2013.01); *F17C 2221/012* (2013.01); *F17C 2227/0157* (2013.01)

(56) References Cited

U.S. PATENT DOCUMENTS

| | | | | |
|---|---|---|---|---|
| 3,276,673 | A | * | 10/1966 | Jones ................. F04B 5/00 417/385 |
| 3,416,453 | A | * | 12/1968 | Feuillebois ............ F04B 23/06 417/388 |
| 3,743,266 | A | | 7/1973 | Sturman |
| 4,488,626 | A | | 12/1984 | Handke |
| 4,527,430 | A | | 7/1985 | Leathers |
| 4,627,292 | A | * | 12/1986 | Dekrone ................ G01L 13/025 73/728 |
| 4,674,335 | A | | 6/1987 | Wendt |
| 5,074,755 | A | | 12/1991 | Vincent |
| 5,703,334 | A | | 12/1997 | Hansson |
| 6,554,578 | B1 | | 4/2003 | Siegel |
| 6,672,841 | B1 | | 1/2004 | Herklotz |
| 2003/0031565 | A1 | * | 2/2003 | Kleibrink ............ F04B 45/0533 417/388 |
| 2003/0089117 | A1 | | 5/2003 | Mao |
| 2003/0219346 | A1 | | 11/2003 | Abe |
| 2006/0102149 | A1 | | 5/2006 | Furusawa |
| 2007/0089382 | A1 | | 4/2007 | Miura |
| 2008/0294327 | A1 | | 11/2008 | Oono |
| 2010/0158716 | A1 | | 6/2010 | Laessle |
| 2011/0189029 | A1 | | 8/2011 | Van De Velde |
| 2001/0284089 | | | 11/2011 | Knuth |
| 2013/0291645 | A1 | | 11/2013 | Gammon |
| 2016/0115850 | A1 | | 4/2016 | Otsuki |
| 2016/0160825 | A1 | | 6/2016 | Usui |
| 2017/0059089 | A1 | | 3/2017 | Uchida |
| 2018/0135616 | A1 | | 5/2018 | Adams |
| 2018/0283284 | A1 | | 10/2018 | Veilleux |

FOREIGN PATENT DOCUMENTS

| | | | | |
|---|---|---|---|---|
| DK | 201570293 | A1 | 5/2015 | |
| ES | 2043540 | A2 | 12/1993 | |
| FR | 2070037 | | 9/1971 | |
| FR | 2558256 | A1 | 7/1985 | |
| KR | 20100111086 | A | 10/2010 | |
| WO | 2009157026 | A1 | 12/2009 | |
| WO | WO-2009157026 | A1 * | 12/2009 | .......... F04B 43/0081 |
| WO | 2016184468 | A1 | 11/2016 | |

OTHER PUBLICATIONS

International Search Report for corresponding application PCT/DK2018/050170 filed Jun. 28, 2018; dated Nov. 6, 2018.
International Search Report for corresponding application PCT/DK2018/050171 filed Jun. 28, 2018; dated Dec. 7, 2018.

* cited by examiner

CONTROL OF A HIGH-PRESSURE COMPRESSOR

TECHNICAL FIELD

The disclosure relates to a high-pressure compressor and a method of controlling a high-pressure compressor more specific controlling the pressure of hydraulic fluid in the hydraulic chamber while the compressor is not in operation to facilitate pressurized start-up of the compressor.

BACKGROUND

Control of a compressor including starting up the compressor is typically done via a frequency converter adjusting the frequency of the voltage applied to the electric motor driving the crankshaft and thereby the piston of the compressor. Hence, by controlling the electric motor the speed and torque of the crankshaft and piston of the compressor can be controlled.

Accordingly, the larger motor and/or the higher the pressure is in the compression gas chamber during start up, the more power and thereby larger and more expensive frequency converter is required.

High-pressure compressors are typically designed for continuous operation. Operating them otherwise will increase wear and thereby reduce lifetime of the compressor. However, in some applications such as in a hydrogen refueling station, the frequency of starting and stopping the compressor may vary by the number of refueling i.e. a plurality of starting and stopping of the compressor can be expected.

When terminating a refueling, pressurized hydrogen is trapped in the conduits between storage or compressor and dispenser at a pressure which may be above 500 bar. Today, venting of the high-pressure hydrogen to reduce this pressure is required for the compressor to start up again. Obviously, this is a problem since the vented hydrogen is a direct loss (of gas and energy used to pressurize it) and since it takes time to build up pressure in the compressor again reducing the efficiency of the compressor and thereby of the refueling station.

BRIEF SUMMARY

The disclosure facilitates starting a compressor having a pressure in the compression chamber higher than 20 bar and even up to several hundred or a thousand bar while avoiding the above mentioned disadvantages.

The disclosure relates to a method of controlling pressure of a hydraulic fluid in a hydraulic fluid chamber of a high-pressure compressor, the pressure of the hydraulic fluid in the hydraulic fluid chamber is increased towards a desired compressor start-up pressure. Wherein the pressure increase of the hydraulic fluid in the hydraulic fluid chamber is controlled by a control element and a hydraulic injection pump assembly. Wherein the pressure increase is performed while the compressor is not in operation.

When the compressor is not in operation, the temperature hereof and thereby the temperature of the hydraulic fluid and fluid (also referred to as gas including hydrogen gas) decreases. The reduced temperature of the hydraulic fluid will lead to a reduced pressure and volume of the hydraulic fluid. After a settling time. Typically, when the compressor and thereby the hydraulic fluid has reached the ambient temperature of the compressor.

The disclosure is advantages in that before starting the compressor after a settling time (or partly elapsed settling time), the pressure in the hydraulic chamber can be increased towards (but not equal to or above) the pressure in the gas chamber or in the gas supply storage connected to the inlet of the gas chamber. This pressure is referred to as the desired compressor start-up pressure. At this pressure, sufficient hydraulic fluid is introduced between the diaphragm and piston.

The disclosure is advantageous in that it has the effect that it facilitates a way of starting the compressor while loaded (pressurized). Starting the compressor at the desired compressor start-up pressure is advantageous in that it has the effect that it reduces the start-up time and saves energy and power consumption by preserving hydrogen and compression energy which has already been stored in the compressor loop. Hence, by avoiding venting, no pressurized fluid from the gas chamber e.g. hydrogen gas and no compression energy (energy used on establish the pressure of the fluid in the gas chamber) is lost.

The control element is preferably electric e.g. implemented as a controller such as a PLC communicating with pressure sensors, pneumatic or electromechanical valves. The pressure sensor may be implemented e.g. as a displacement sensor where the displacement of a displacement member is measured by an optic distance measurement sensor. Alternatively, the pressure sensor may be a traditional sensor measuring pressure directly inside the hydraulic system.

The control element may alternatively be referred to as mechanic e.g. implemented as a valve which mechanically terminates flow at a given pressure. Such valve may be adjusted mechanically or electrically.

The hydraulic pump assembly may be implemented as a pump the operation of which may be controlled by the control element. Alternatively, the hydraulic pump assembly may be implemented as an injection assembly as described below.

The compressor is defined as not in operation, when there are no mechanical movement of the crank shaft and piston in the hydraulic system or at least when no heat is generated from such mechanical movement.

The compressor is preferably a diaphragm compressor.

According to an embodiment the disclosure, the method further comprising the steps of: establish a representation of pressure of the hydraulic fluid in the hydraulic fluid chamber of the hydraulic system, determine a desired start-up pressure of the hydraulic fluid in the hydraulic fluid chamber, by the control element comparing the pressure of the hydraulic fluid in the hydraulic fluid chamber and the desired start-up pressure, and terminating a pressure increase within the hydraulic fluid chamber when the pressure of the hydraulic fluid chamber reaches the desired start-up pressure.

Establish the desired start-up pressure in the hydraulic fluid chamber after a period of non-operation of the compressor is advantages in that it has the effect, that it facilitates an efficient start of the compressor/in terms a more gentle start that lower wear on compressor components and preserves gas (no venting required) and compression energy.

Starting the compressor when the pressure of the hydraulic fluid in the hydraulic fluid chamber has reached the determined desired start-up pressure is furthermore advantages in that it has the effect, that the time used on starting the compressor and reaching desired pressure in the gas hydraulic chamber to start compressing gas in the gas chamber is reduced. This is because the desired start-up pressure can be maintained during any desired period of time between stopping and subsequently starting the compressor again.

Establishing a representation of pressure in the hydraulic fluid chamber can be done by means of a pressure sensor or simply a valve, which change position at a determined pressure during pressure increase process.

The desired start-up pressure is preferably just below the pressure of gas in the gas chamber or in the gas supply storage. Hence, the desired start-up pressure can be determined from a pressure measurement in the gas conduit leading gas to or from the gas chamber of the compressor. In an embodiment, the desired start-up pressure is determined as or based on a pressure measured downstream the compressor towards or at the dispenser. In an embodiment, this pressure would be the pressure at which e.g. a hydrogen vehicle refueling was terminated.

The desired start-up pressure may be predetermined at a level which is determined based on system design of the hydrogen refueling station. It can be determined based on input pressure to the compressor i.e. pressure of the supply storage of a hydrogen refueling station. It can be determined as the pressure at which the compressor was stopped.

Accordingly, the disclosure is advantages in that it has the effect, that by knowledge of the supply storage pressure the pressure in the hydraulic fluid chamber can be adjusted to a pressure just below this pressure enabling the compressor to, immediately after opening a valve enabling flow of gas from supply storage to compressor, start working from this pressure i.e. no pressure reduction of supply storage pressure or venting of gas is required before staring the compressor.

The control element controlling the pump assembly is preferably comparing the desired start-up pressure determined as described above to the hydraulic fluid in the hydraulic fluid chamber. This is preferably done based on pressure measurements received from sensors leading to a control signal from the control element to the motor/motor drive controlling the compressor.

According to an embodiment the disclosure, the method further comprising the step of starting the compressor after the pressure of the hydraulic fluid in the hydraulic fluid chamber has reached the desired start-up pressure. The present disclosure solves the problem of starting a pressurize compressor after a period of non-operation. During such period, the pressure/volume decreases of the hydraulic fluid in the hydraulic system, including in the hydraulic fluid chamber as consequence of a temperature decrease in the hydraulic fluid caused by the non-operation of the compressor.

According to an embodiment the disclosure, the pump assembly comprise an electric pump, pumping hydraulic fluid from a hydraulic fluid reservoir via a conduit to the hydraulic fluid chamber. This is advantages in that it has the effect, that in this way pressure in the hydraulic fluid chamber can be maintained despite temperature decrease, leakage at the piston and if present any pressure reduction occurring in relation to the return conduit from fluid chamber to fluid reservoir.

According to an embodiment the disclosure, the pump assembly pumping the hydraulic fluid from the fluid reservoir to the hydraulic fluid chamber comprise: an injection assembly forming part of a hydraulic fluid path between a low-pressure part of the hydraulic system and the high-pressure part, the injection assembly comprising: an output valve, a valve, and an injection pump establishing a flow of hydraulic fluid from the low-pressure part to the high-pressure part when the output valve is open, and a pressure sensor establishing a feedback signal representing the pressure in the high-pressure part. Wherein the injection pump establishing a pressure potential of injection of hydraulic fluid when the valve is closed and when the output valve is closed, and wherein a controller is controlling the pressure potential of injection of hydraulic fluid into the high-pressure part, by control of the injection assembly based on the feedback signal and a hydraulic fluid peak pressure target value of a desired pressure of hydraulic fluid in the high-pressure part.

According to an embodiment the disclosure, the pressure potential of injection of hydraulic fluid is established in the injection assembly.

According to an embodiment the disclosure, the amount of hydraulic fluid injected into the high-pressure part in a compression cycle is determined by the established potential of injection of hydraulic fluid, wherein the potential of injection of hydraulic fluid is controlled by controlling the valve based on the pressure difference between the pressure represented by the feedback signal and the peak pressure target value.

Alternatively, the injected amount is simply the amount of hydraulic fluid that can be injected during a period of time where the pressure in the high-pressure part is below the established injection pressure potential.

In practice this amount is determined by the size of established potential of injection of hydraulic fluid i.e. the pressure established in the injection assembly (i.e. between valve, output valve and injection pump) and the inlet gas pressure determining the lowest pressure in the hydraulic fluid chamber and thereby if and for how long time (in a compression cycle) the output valve is open.

Hence a control loop exists where injection pressure potential is controlled based on injection of hydraulic fluid and the amount of hydraulic fluid injected is determined based on the difference between the pressure represented by the feedback signal and the peak pressure target value.

Preferably the hydraulic fluid is an incompressible fluid or a fluid having an as low compressibility as possible. Oil is preferred in that sealing's of the compressor piston is lubricated by oil leaking from the high-pressure part to the reservoir.

Using the feedback signal representing the pressure in the high-pressure part to control the amount of hydraulic fluid to inject, is advantageous in that the otherwise non-detectable leakage of hydraulic fluid at the piston is also compensate for.

According to an embodiment the disclosure, the pressure is increased during a plurality of compression cycles following the compression cycle during which the feedback signal representing the pressure of the high-pressure part was below the peak pressure target value. This is advantageous in that adjusting the pressure in just one compression cycle following the compression cycle in which the feedback signal was obtained would require a sophisticated injection assembly. However, in case the pressure is adjusted in the subsequent compression cycle, the wear of the compressor would be reduced.

According to an embodiment the disclosure, the feedback signal representing the pressure in the high-pressure part is measured in each compression cycle.

According to an embodiment the disclosure, the controller is controlling the potential of injection of hydraulic fluid so that the pressure in the high-pressure part is always above a reference potential which is equal to or higher than the inlet pressure of the gas. This is advantageous in that this prevents the diaphragm from getting in contact with the bottom of the hydraulic fluid chamber and thereby avoiding cavitation.

The control of the lower pressure is preferably made based on a reference pressure measurement obtained from a pressure sensor measuring the pressure of the gas entering the gas chamber and/or the signal from the pressure sensor.

According to an embodiment the disclosure, the feedback signal is established by a pressure sensor comprise a housing mounted to the high-pressure part in which a cylinder with a piston in fluidly connection with the hydraulic fluid of the high-pressure part is located, a displacement member and a displacement sensor, wherein the pressure of the hydraulic fluid in the high-pressure part is physically displacing a displacement member and wherein the size of the displacement is measured by a displacement sensor.

The displacement based pressure sensor is advantageous when used on a compressor controlled according to the present disclosure. This is because the inventive control only injects a very small amount of hydraulic fluid leading to only a very small amount of excess hydraulic fluid. Hence because the amount is so small, a flow is difficult to measure. Instead since the excess amount is so small it is possible to guide it to a cylinder of the pressure sensor where it activates a piston, where it again activates the displacement member according to the pressure of the hydraulic fluid.

According to an embodiment the disclosure, the method further comprises the step of establish a representation of pressure of a fluid in a gas chamber of the compressor, and wherein the desired start-up pressure is determined as a pressure below the pressure of the fluid in the gas chamber. Preferably, the pressure of fluid in the gas chamber is established by a pressure sensor located in a conduit between a valve and the fluid inlet to the gas chamber or in a conduit between a valve and the fluid outlet from the gas chamber.

Alternatively, by knowledge of the pressure of the hydraulic fluid in the hydraulic fluid chamber the pressure of fluid in the gas chamber can be determined. In yet another alternative, the pressure of the supply storage is used to determine the desired start pressure.

According to an embodiment the disclosure, the desired start-up pressure is determined between 50-75% of the pressure of the fluid in the gas chamber, preferably between 76-85% of the pressure of the fluid in the gas chamber and most preferably between 86-100% of the pressure of the fluid in the gas chamber. This is advantages in that it has the effect that the pressure of hydraulic fluid in the hydraulic fluid chamber is increased up to but not above the pressure of fluid in the gas chamber. The closer the desired start-up pressure is to the pressure of the fluid in the gas chamber, the more cost efficient and wear reducing the start of the compressor can be made.

According to an embodiment the disclosure, a desired volume increase of the hydraulic fluid in the hydraulic fluid chamber is established by introducing between 0.1 and 10 milliliters of hydraulic fluid preferably between 0.2 and 7 milliliters of hydraulic fluid and most preferably between 0.3 and 5 milliliters into the hydraulic fluid chamber before starting the compressor. The desired volume increase may be established based on knowledge of pressure/volume of gas and/or hydraulic pressure prior to start introducing hydraulic fluid and knowledge hereof from just after the compressor stopped.

According to an embodiment the disclosure, the pressure of the hydraulic fluid in the hydraulic fluid chamber is established by a pressure sensor in fluid communication with the hydraulic fluid chamber. An example is to measure pressure in the pressure chamber by means of a pressure sensor. The pressure sensor could be a displacement sensor communicating with a controller controlling the introduction of hydraulic fluid.

The pressure sensor may be implemented as a pressure regulating valve. The pressure regulating valve could be adjusted to a desired pressure which when reached either would allow hydraulic fluid to return to a hydraulic fluid reservoir.

Moreover, the disclosure relates to a high-pressure compressor comprising a hydraulic system and a gas chamber, the hydraulic system comprises a reservoir, connected to a hydraulic fluid chamber by a hydraulic flow path and a pump assembly positioned in the hydraulic flow path, the compressor furthermore comprise a control element controlling the flow of hydraulic fluid in the hydraulic flow path and thereby the pressure in the hydraulic fluid chamber, wherein the control element and the pump assembly is configured for controlling the pressure of hydraulic fluid in the hydraulic fluid chamber when the compressor is not in operation.

This is advantages in that despite the pressure decrease within the hydraulic fluid chamber occurring when the temperature of the hydraulic fluid drops, the pressure hereof can be maintained at a desired level by introducing a volume of hydraulic fluid from the reservoir into the hydraulic fluid chamber while the compressor is not in operation. Hence, when the compressor is to start-up again after a settling time as least party has elapsed, the start-up can be made as efficient as possible and even while loaded (pressurized). Starting the compressor at the desired compressor start-up pressure is advantageous in that it has the effect that it saves energy and power consumption by preserving hydrogen and compression energy which has already been stored in the compressor loop. Hence, by avoiding venting no pressurized fluid from the gas chamber e.g. hydrogen gas and no compression energy (energy used on establish the pressure of the fluid in the gas chamber) is lost.

The control element preferably includes a controller such as a PLC, the PLC will control the pump assembly to establish a desired pressure in the hydraulic fluid chamber. Preferably the desired pressure is established by introducing a volume of hydraulic fluid into the hydraulic fluid chamber.

Reference to control element may include reference to a valve located at the entrance of the hydraulic fluid chamber. This valve may however also be referred to as included in what is referred to as pump assembly or injection assembly. The valve may be mechanical or electric adjustable to allow flow above or below a given pressure.

According to an embodiment the disclosure, the control of pressure of hydraulic fluid in the hydraulic chamber includes maintaining a desired pressure and/or increasing a present pressure of hydraulic fluid in the hydraulic fluid chamber to a desired start-up pressure. This can be achieved by introducing a volume of hydraulic fluid into the hydraulic fluid chamber.

According to an embodiment the disclosure, the control of the flow of hydraulic fluid in the hydraulic flow path is controlled by the control element so that flow of hydraulic fluid to the hydraulic fluid chamber is allowed when the pressure of hydraulic fluid in the hydraulic fluid chamber is below the desired start-up pressure. This is advantages in that it has the effect that the pressure of fluid in the hydraulic fluid chamber in this way can be maintained at a desired level According to an embodiment the disclosure, the desired start-up pressure is determined by the control element based on a representation of pressure of a fluid in a gas chamber of the compressor and knowledge of pressure of in the hydraulic fluid chamber.

According to an embodiment the disclosure, the pump assembly pumping the hydraulic fluid from the fluid reservoir to the hydraulic fluid chamber comprise: an injection assembly forming part of a hydraulic fluid path between a low-pressure part of the hydraulic system and the high-pressure part, the injection assembly comprising: an output valve, a valve, and an injection pump configured for establishing a flow of hydraulic fluid from the low-pressure part to the high-pressure part when the output valve is open, and a pressure sensor configured for establishing a feedback signal representing the pressure in the high-pressure part. Wherein the injection pump is configured for establishing a pressure potential of injection of hydraulic fluid when the valve is closed and when the output valve is closed, and wherein a controller is configured for controlling the pressure potential of injection of hydraulic fluid into the high-pressure part, by control of the injection assembly based on the feedback signal and a hydraulic fluid peak pressure target value of a desired pressure of hydraulic fluid in the high-pressure part.

According to an embodiment the disclosure, the fluid compressed by the high-pressure compressor is hydrogen gas. The fluid compressed by the compressor is preferably a hydrogen gas, but could in principle be any kind of gas or liquid fluids.

According to an embodiment the disclosure, the high-pressure compressor facilitates pressurizing the fluid in the gas chamber to a pressure above 10 MPa. Hence, the compressor is categorized as a high-pressure compressor in that it facilitates pressurizing fluid in the pressure chamber to a pressure above 10 MPa.

According to an embodiment the disclosure, the length of the gas chamber and the hydraulic fluid chamber of the high-pressure compressor is longer than the width hereof. Hence the compression chamber has an oblong shape preferably an elliptic shape.

According to an embodiment the disclosure, the only return conduit connecting the hydraulic fluid chamber and the hydraulic fluid reservoir is an emergency vent line. This is advantages in that it reduces the complexity of the compressor design, however it at the same time increases requirements to control of flow to the hydraulic fluid chamber.

According to an embodiment the disclosure, the compressor comprise a pressure sensor comprising a housing connected to a compressor head, the housing comprising a piston movably mounted in a cylinder, the cylinder is fluidly connected to a high-pressure part of a hydraulic system of the compressor, wherein the piston is adapted to be moved in a first direction away from the compressor head by the pressure of the hydraulic fluid in the high-pressure part, the piston is thereby adapted to move a displacement member which is movably attached to the housing by one or more flexible suspensions, and wherein the piston is adapted to be moved in a second direction towards the compressor head by the flexible suspension via the displacement member.

According to an embodiment the disclosure, the compressor is a two-stage compressor having a head configured to establish a first pressure and a second head configured to establish a second pressure, wherein the second pressure is higher than the first pressure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
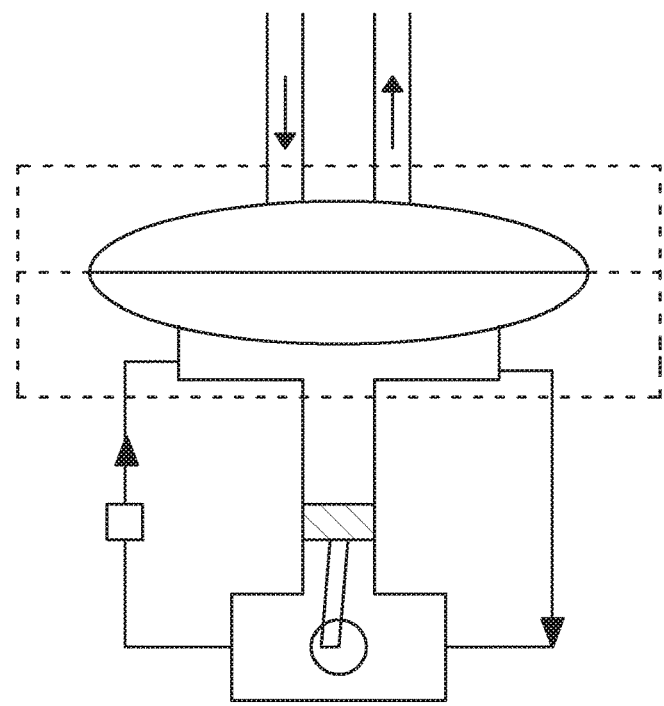
FIG. 1 illustrates an example of a prior art compressor.

FIG. 1 illustrates an example of a prior art type of control of the hydraulic pressure in a diaphragm compressor. A pump is simply pumping oil from the hydraulic fluid reservoir into the oil chamber and when the diaphragm reaches its maximum, the excess oil exits the oil chamber via a return path to the reservoir. The amount of oil pumped into the oil chamber is the same for each compression cycle and "enough" to ensure that some quantity exist the oil chamber and thereby maximum pressure have been reached.

Figure 2:
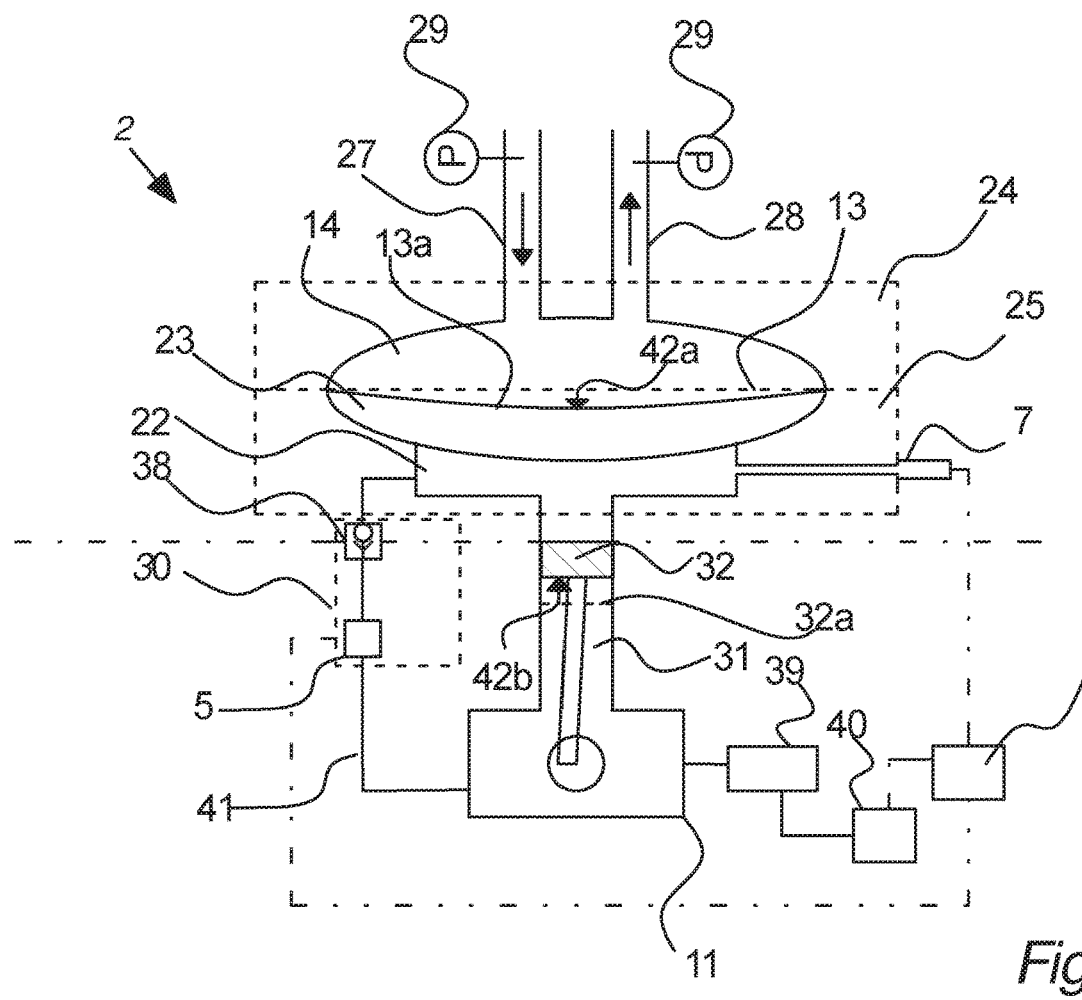
FIG. 2 illustrates an example of a hydraulic system controlled according to present disclosure.

FIG. 2 illustrates a compressor 2 having an gas inlet 27, a gas chamber 14 in which gas is compressed before leaving via the gas outlet 28. The gas is compressed by a diaphragm 13 the movement of which is controlled by the hydraulic system of the compressor 2. The hydraulic system of the present disclosure has many elements in common with the hydraulic system described in Danish patent application No.: PA 2017 70570 which is hereby incorporated by reference.

The pressure of the hydraulic fluid of the hydraulic system is changed by a piston 32 moved in a cylinder 31. The piston 32 is moved by its connection to the crank shaft and the crank shaft is mechanically connected to an electric motor 39. Hence the movement (speed) and force (torque) of the piston 32 is controlled by the voltage applied to the motor 39, a voltage which is preferably controlled by a motor drive 40. The higher torque required to start the compressor 2 the larger motor 39 and motor drive 40 is required.

The density of the hydraulic fluid (and fluid in the gas chamber) varies with its temperature. Accordingly, when the compressor 2 is operating, the hydraulic fluid is hot and the density is high compared to the density of the hydraulic fluid is cold (e.g. ambient temperature) when the compressor is not operating.

Based on this fact, the volume and thereby pressure of at least the hydraulic fluid (also referred to as working fluid) decreases leading to a smaller distance between diaphragm 13 and piston 32. At least one of the diaphragm 13 and piston 32 will move in the direction of the arrows denoted 42a and 42b on FIG. 2. The change in distance between membrane 13 and piston 32 due to the change in pressure/volume is very small. In an example it is less than 5 millimeters most often between 0.1 and 2 millimeters, nevertheless due to the very fine tolerances of the compression cycle these changes have significant importance in relation to starting up the compressor 2. Mainly that the changes are enough to put the diaphragm 13 and piston 32 out of phase.

By introducing hydraulic fluid into the hydraulic fluid chamber 23 both pressure and volume of the hydraulic fluid increases. By introducing hydraulic fluid during the non-operation period the mechanical system of compressor is prepared to perform a loaded start up. Hydraulic fluid is preferably introduced until a pressure change is measured, more specific until a start-up pressure is measured in the hydraulic fluid chamber 23. Most important is that by introducing hydraulic fluid before starting up the compressor 2 it is ensured that there is sufficient hydraulic fluid between the diaphragm 13 and piston 32 to avoid high loads on the mechanical parts of the compressor 2 especially the diaphragm 13 and seals in the hydraulic system.

The movement of diaphragm 13 due to the temperature decrease is illustrated by the arrow 42a and the stipulated illustration of the diaphragm 13a. Shortly after the stopping of the operation of the compressor 2 the diaphragm 13 hereof finds a resting position depending on the pressure in the gas chamber 14 and in the hydraulic fluid chamber 23. This resting position is illustrated by the solid diaphragm 13a. Alternative or in addition, the compressed hydraulic fluid due to the decrease in temperature can lead to displacement of the piston 32 as indicated by arrow 42b.

In both situations, the location of the piston 32 and/or the diaphragm 13 may not be known for sure and therefore out of phase so to speak. This out of phase position of diaphragm 13 and piston 32 will lead to a hazardous start-up, in case of a loaded start up. Starting a high-pressure compressor 2 with pressure of the gas in the gas chamber 14 up to e.g. between 100 and 900 bar (or even higher depending on the size of the motor 39) and with no exact knowledge of location of diaphragm and/or piston can introduce very high loads/wear to the diaphragm and/or leakage at the piston. The primary problem of running/starting the compressor loaded without proper phasing would be damage to membranes and seals of the hydraulic system including membrane seal and piston/rod seal, but the other components of the compressor can potentially suffer as well. These components may include piston, crank shaft leading to increased wear and reduced life time. Accordingly, by controlling pressure during non-operation of the compressor these problems can be avoided. The pressure can be controlled by introducing hydraulic fluid into the hydraulic fluid chamber 23 thereby increasing the volume of the hydraulic fluid herein.

As mentioned, known systems are venting gas to be sure to have sufficient hydraulic fluid between diaphragm 13 and piston 32 when starting the compressor with the mentioned disadvantages and in addition to ensure the diaphragm 13 will not hit the lower chamber i.e. the bottom of the hydraulic fluid chamber 23.

After a settling time, i.e. the time the temperature of the compressor 2 and the hydraulic fluid hereof (and gas) takes to decrease to ambient temperature, the diaphragm 13 may have moved to the position illustrated by the solid diaphragm 13. The movement of the diaphragm from position 13 to position 13a occurs due to density change of the hydraulic fluid and of the gas (in the gas chamber 14) when its temperature is reduced. Leakage if any at the piston 32 may also contribute to the displacement.

Starting the compressor 2 and building up a start pressure requires more time compared to the situation, where the pressure increase in the hydraulic chamber 23 according to the present disclosure has not occurred. This is because a number of strokes has to be made with the piston 32 to establish pressure in the hydraulic fluid chamber 23 before the pressure here is high enough to move the diaphragm and thereby start compressing gas in the gas chamber 14. The present disclosure is advantages in that it facilitates controlling the pressure of hydraulic fluid in the hydraulic fluid chamber 23 while the compressor is not in operation thereby reducing time for building pressure.

The above-mentioned control of the pressure of hydraulic fluid in the hydraulic fluid chamber 23 is made by a control element 8 communicating with a pump assembly 30 and preferably also a pressure sensor 7 (the latter however is not mandatory).

In a preferred embodiment, the controller element 8 is a PLC (PLC; Programmable Logic Controller) receiving data representing the pressure of gas in the gas chamber 14 or supply storage (inlet pressure to compressor 2, not illustrated). This pressure is preferably measurement from one or more pressure sensors 29. This pressure is used to determine the desired start pressure, typically the desired start pressure is just below (i.e. 1-10 and even more bar below) the pressure of the gas. As an example could be mentioned 1-3 bar, 1-5 bar or even higher. Further, the controller 8 preferably receives data representing the pressure of hydraulic fluid in the hydraulic fluid chamber 23, preferably from a measurement from a pressure sensor 7.

The result of a comparison of the pressure of both sides of the diaphragm 13 can be used for determining operation of the pump 5 of the pump assembly 30 and thereby if pressure increase in the hydraulic fluid chamber is required. It should be mentioned that the need of a pressure increase can be determined e.g. if the pressure of the hydraulic fluid in the hydraulic fluid chamber 23 is a percentage below or a fixed number below the pressure of gas in the gas chamber 14, supply storage or the desired start-up pressure. The pressure increase can e.g. be controlled continuously so that it is increased as the density (and thereby pressure/volume) drops or discrete (just before start-up) to ensure desired start-up pressure at the time of a planned start of the compressor 2.

Hence, the pressure increases in the hydraulic fluid chamber 23 by introducing hydraulic fluid, can be made any time during times where the compressor is not in operation. This results in sufficient hydraulic fluid between the diaphragm 13 and piston 32 when starting, leading to faster start sequence to reach desired output pressure at the output 28 of the gas chamber. Further, a more gentle start leading to less wear of the compressor which is very relevant in applications where the compressor 2 starts and stops a lot such as in a hydrogen refueling station.

According to an embodiment of the disclosure, the compressor 2 is a two-stage compressor having two compressor heads i.e. a low pressure and a high-pressure head/stage.

As is now clear from the above, the present disclosure relates to a method of performing a start-up of a high-pressure compressor i.e. a compressor facilitating pressurizing a fluid (preferably a gas such as a hydrogen gas) to a pressure above 100 bar. The start-up can be optimized by controlling pressure of the hydraulic fluid in the hydraulic fluid chamber 23. One method of controlling this pressure is determining the pressure of the hydraulic fluid in the hydraulic chamber 23 and the pressure of the gas in the gas chamber 14 or supply storage. Then based hereon, prior to starting up the compressor 2, by means of the pump/injection assembly 30 and the controller 8 establish a hydraulic pressure in the hydraulic fluid chamber 23 up to a desired start pressure (which is below the pressure of the gas in the gas chamber 14). Thereby sufficing volume of hydraulic fluid is ensured in the hydraulic fluid chamber prior to starting up the compressor 2.

Figure 3:
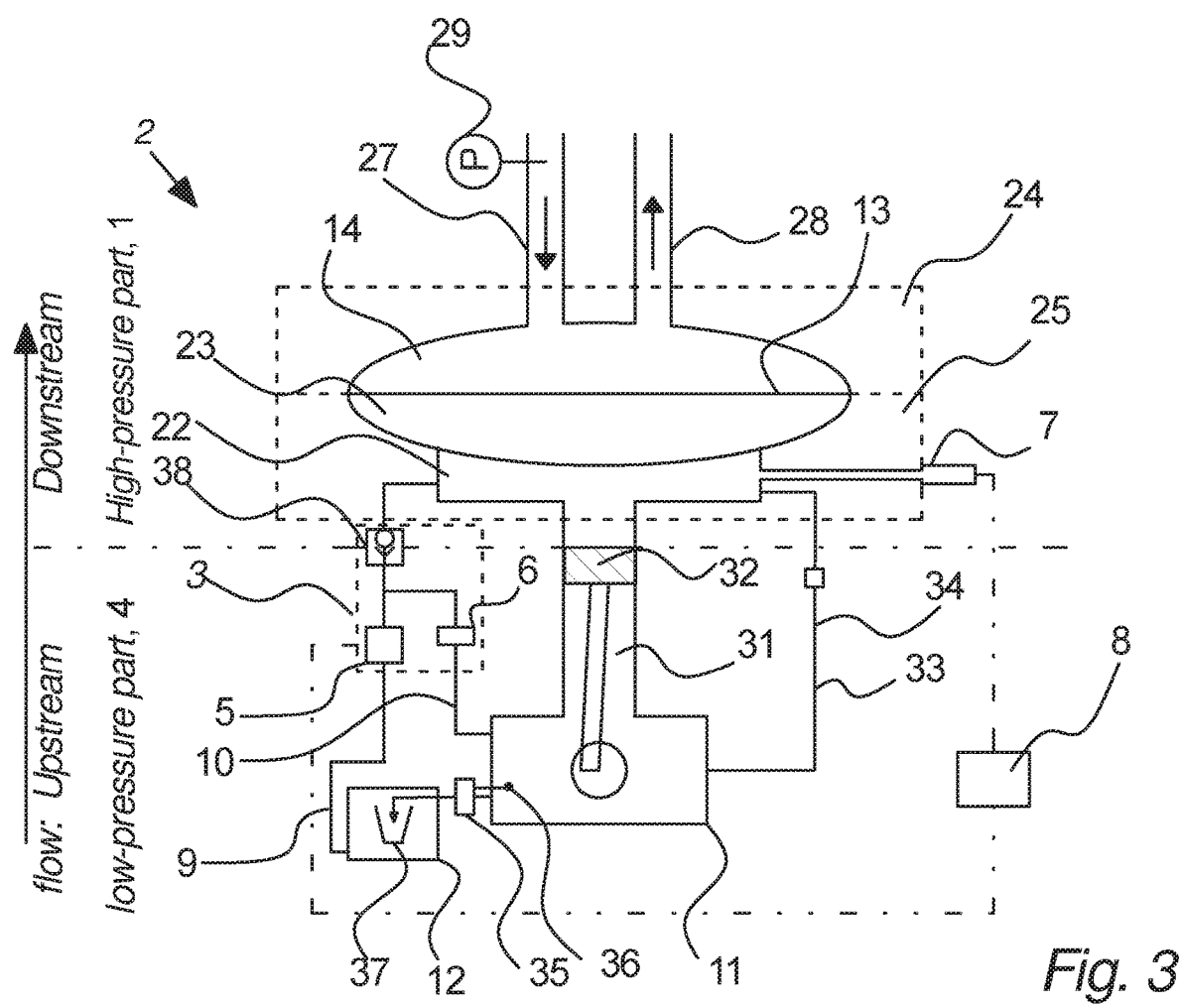
FIG. 3 illustrates an example of a compressor according to an embodiment of the present disclosure.

FIG. 3 (and the other figures) illustrates a preferred embodiment of the present disclosure, hence the description in relation to the figures should only be understood as such leaving room for changes to the description still being within the scope of the disclosure.

A compressor 2 having an upper compressor head 24 in which a gas chamber 14 is present and a lower compressor head 25 in which a hydraulic fluid chamber 26 is present.

The upper compressor head 24 has a gas inlet port 27 and a gas outlet port 28.

The pressure of the gas inlet may be measured by a pressure sensor 29.

The lower compressor head 25 is part of a high-pressure part 1 illustrated above the dot/dash line. Hence, the high-pressure part 1 is found downstream the injection assembly 3 including part of a hydraulic fluid flow path, hydraulic distribution plate 22, hydraulic chamber 26 and part of the compressor cylinder 31 above the compressor piston 32 and a pressure sensor 7.

Illustrated is also an emergency vent line 33 from the high-pressure part 1 to the hydraulic fluid reservoir 11 (referred to as reservoir). Flow in the emergency vent line 33 is controlled by an emergency valve 34. The emergency valve 34 is preferably controlled mechanically so that if the pressure of the exceeds a predetermined value the emergency valve 34 opens and pressure is reduced in the high-pressure part 1 a hydraulic fluid exits to the reservoir 11. Accordingly, this emergency vent line is not part of control of the hydraulic pressure in the high-pressure part 1 but is only used in case of emergency as a so-called second stage overprotection.

Below the dot/dash line dividing the hydraulic system at the output valve 38 and compressor piston 32 is the low-pressure part 4. Hence the low-pressure part 4 is found upstream the injection assembly 3 including part of a flow path, reservoir 11, hydraulic fluid supply station 12 (referred to as supply station) and connection hereto illustrated by a pump 35. The pump 35 facilitates pumping hydraulic fluid from the reservoir 11 to the supply station 12. In addition, the connection may comprise not illustrated filters or venting components.

It should be mentioned, that the pressure in the part of the hydraulic flow path downstream the injection assembly 3 is normally higher that the pressure of the part upstream the injection assembly 3. Normally, the pressure in the injection assembly 3 (between the injection pump 5, valve 6 and output valve 38) is close the to the gas inlet pressure so that an increased pressure (pressure potential) above this pressure can be established fast.

The output valve 38 is preferably a check valve or another kind of mechanically controlled pressure valve but could also be an electrically controlled valve.

The pump 35 is controlled by a level sensor 36. When the level of hydraulic fluid in the reservoir 11 is above a predefined level, the hydraulic fluid is pumped to the supply station 12. As illustrated, the supply station 12 comprise diagonal like walls 37 through which the hydraulic fluid has to travel. Therefore, the walls 37 are perforated or designed as a net having meshes between 50μ [mu] and 150μ [mu], preferably 100μ [mu]. The walls 37 may be implemented as forming a basket in which the hydraulic fluid from the reservoir 11 enters mixed with air and when leaving the basket through the walls 37 ending in a reservoir without the air.

Due to this small size of the holes and surface tension air bubbles mixed into the hydraulic fluid is filtered away traveling towards to the top of the supply station 12 leaving air free hydraulic fluid to be ready to be sucked up into the forward path 9 by the injection pump 5.

As illustrated the injection assembly 3 is located in the flow path between the high and low-pressure parts 1, 4. Besides the injection pump 5, the injection assembly 3 comprise a valve 6 which is preferably located in the return path 10 and the output valve located in the flow path to the high-pressure part 1.

Preferably, the injection pump is continuously pumping hydraulic fluid from the supply station 12 to compensate for leakages at the compressor piston 32. In addition, the continuous pumping is used to create an injection pressure potential which is at a level controlled by how much of the hydraulic fluid is allowed to circulate back to the reservoir 11.

It should be mentioned, that the forward path 9 could also simply be connecting the reservoir 11 and the injection pump 5. However, due to the movement of the compressor piston 32 the hydraulic fluid in the reservoir 11 is mixed with air which is then sucked up into the injection pump 5 and further into the high-pressure part 1. Air is not desired in the high-pressure part in that it air is compressible i.e. opposite of desired property of the hydraulic fluid hence with air in the hydraulic fluid the compressed less effective as without. Accordingly, to avoid this the supply station 12 is developed to filter air.

It should be mentioned that the valve 6 could also be located downstream the injection pump 5, however this location is not preferred in that it will lead to less flexibility in control of the injection pump and pressure potential. One reason for this is that the pump then needs to be stopped when a given pressure potential is reached in order not to exceed it.

A controller 8 is controlling the operation of the compressor. The controller 8 is communicating at least with the injection assembly and the pressure sensor 7. The same or other controllers may facilitate control of the pump 35, operation of the piston 32, control of the gas in/outlet and other not illustrated elements in relation to operation of the controller.

The hydraulic fluid is preferably an incompressible oil which when leaking around the piston sealing is used for lubrication hereof. Any fluid having limited compression properties which at the same time may facilitate lubrication may in principle be used as hydraulic fluid.

The pressure sensor 7 is on FIG. 3 illustrated as attached to the lower compressor head 25 including the hydraulic distribution plate 22 and hydraulic fluid chamber 23. In relation to location of the pressure sensor 7 it should be mentioned that it in principle can be located anywhere in the high-pressure part 1. Only real limiting factor for its location is that it should be able to be firmly attached to comply with the pressures created by the compressor which may be up to and above 100 MPa. This makes the lower compressor head 25 the obvious choice.

At FIG. 3 the hydraulic fluid distribution 22 plate has a fluid path fluidly connecting it to the pressure sensor 7. As mentioned a similar fluid path could connect the pressure sensor 7 to the hydraulic fluid chamber 23 or the hydraulic fluid flow path from the injection assembly 3 to the lower compressor head 25.

Figure 4:
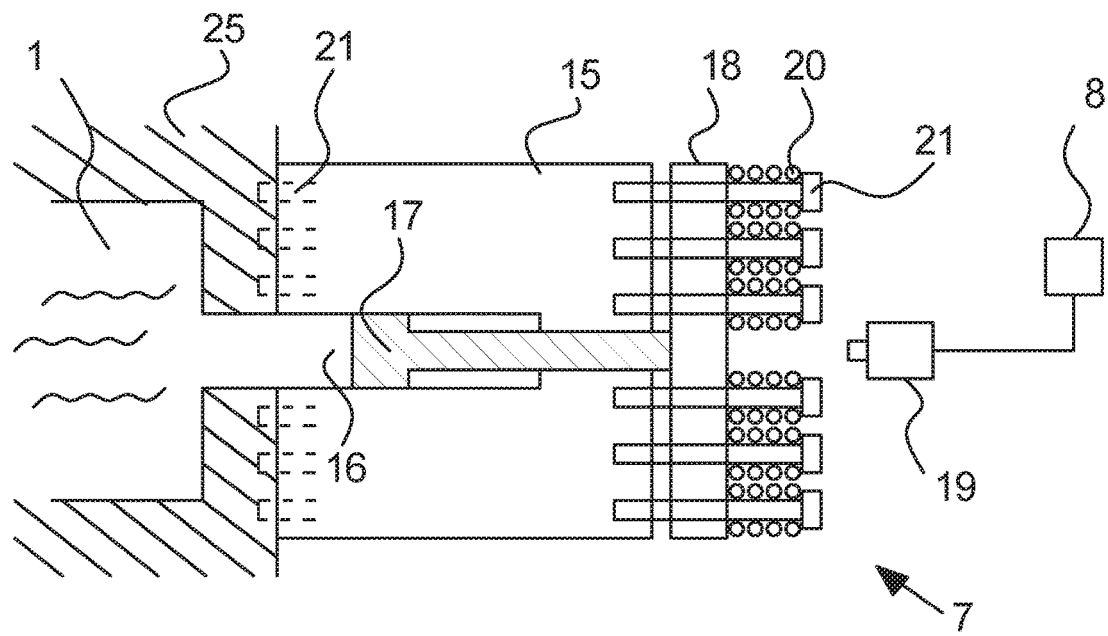
FIG. 4 illustrates a pressure sensor according to an embodiment of the present disclosure.

FIG. 4 illustrates the pressure sensor 7 according to an embodiment of the disclosure. As mentioned, it is not important to which part of the high-pressure part 1 of the compressor 2 the pressure sensor 7 is attached.

At FIG. 4 the housing 15 of the pressure sensor 7 is illustrated as attached to the lower compressor head 25 by means of bolts 21. Preferably the lower compressor head 25 comprise a threated part and the housing 15 comprise not illustrated ducts through which bolts 21 can reach the threated part and thereby fastening the housing 15 to the compressor 2. Other ways of fastening depending on where the housing is connected to the high-pressure part 1 could also be used.

At the opposite end of the housing 15 a displacement member 18 is movably attached to the housing 15 by means of flexible suspensions such as an array of bolt 21/spring 20 arrangements. The torque with which the bolts 21 is tightened and the tension of the springs 20 are determining for the movement of the displacement member 18 at a giver pressure. Hence, by adjusting this the movement can be adjusted.

The pressure sensor 7 comprise a cylinder 16 in which a piston 17 is movable. In one direction, away from the compressor 2 the movement is determined by the pressure of the hydraulic fluid and in a second direction, towards the compressor 2 the movement is determined by the displacement member 18.

At FIG. 4, the piston has moved the displacement member 18 away from the compressor 2 accordingly, the pressure in the high-pressure part 1 has reached or is close to its maximum pressure.

Attached to or in relation to the pressure sensor 7 is illustrated a displacement sensor 19 the purpose of which is to measure the length or size of the movement of the displacement member 18 caused by the piston 17. The displacement sensor 19 is communicating with the controller 8 hence a control loop is established where the control of the injection assembly 3 is made based on feedback from the pressure sensor 7.

Typically, the displacement member 18 is moved less than 1 millimeter. The adjustment of the size of the movement is aligned with a given pressure during a test phase. Prior to the test phase, an estimate of the needed load (spring load, in the embodiment where springs are used as flexible suspensions) is calculated based on expected pressure of the hydraulic fluid and area of the cylinder 16. Then the springs 20 are adjusted to counter act this load which is also referred to as displacement pressure. Accordingly, the pressure acting on the piston 17 from the hydraulic fluid have to be higher than the displacement pressure to move the displace member 18.

During the test phase the displacement pressure is fine-tuned e.g. by mechanically adjusting the displacement pressure until a desired displacement is found at a desired pressure. The desired pressure is referred to as pressure peak target value whereas the actual measured pressure is referred to as pressure peak value. One non-limiting example is that at a pressure peak value of 100 MPa, the size of the displacement is adjusted to be 0.05 mm [millimeter].

The relation between the size of the measured displacement and the pressure in the high-pressure part 1 is according to a non-limiting embodiment as follows. The springs 20 holding the displacement member 18 is fixed so that at a pressure of e.g. 100 MPa the displacement member is moving e.g. 0.05 mm. Accordingly, if only 50 MPa is needed the measured displacement should only be 0.025 mm. Therefore, no establishing of injection potential of hydraulic fluid above inlet pressure is initiated if a displacement of more than 0.025 mm is measured.

The pressure drops in the high-pressure part 1 due to leakage at the compressor piston 32 hence when the measured displacement as consequence hereof drops below 0.025 mm e.g. to 0.020 mm the valve 6 is closed facilitating establishing potential of injection of hydraulic fluid into the high-pressure part 1.

The establishing of the potential of injection is simply made by closing the valve 6 during one or more preferably successive compression cycles. During a compression cycle where the inlet gas pressure is lower than whatever pressure established upstream the output valve 38 this will lead to an injection of hydraulic fluid in the high-pressure part. The injection happens due to pressure equalization between the part of the hydraulic flow path in which the potential is established (i.e. the part from the injection pump 5/(preferably completely closed) valve 6) to the output valve 38. This will in the following compression cycle lead to an increase in the pressure in the hydraulic pressure chamber and thereby to an increased displacement of the displacement member 18 (at least if the injected amount is higher than what is leaking via the compressor piston 32). Hence when the measured displacement again is 0.025 mm or above the establishing of pressure potential is stopped again by opening the valve 6.

The injection pressure potential is in the ideal scenario established as follows. The gas inlet pressure measured by sensor 29 is used as reference pressure (also referred to as reference 0) for the pressure potential. Accordingly, an injection pressure potential is increased by closing valve 6 thereby allowing the injection pump 5 to increase the pressure between valve 6, output valve 38 and injection pump 5. The pressure here continues to increase until it is above the reference pressure which will open output valve 38 allowing an injection of hydraulic fluid into the high-pressure part 1. Even the small amount/volume of hydraulic fluid that can be injected in a compression cycle is enough to increase the peak pressure value in the following compression cycle.

If no injection pressure potential is desired, the valve 6 is kept open thereby the injection pump 5 only pumps hydraulic fluid from the supply station 12 to the reservoir 11 without establishing an injection pressure potential.

Accordingly, in the ideal scenario, the valve 6 is controlling the pressure between valve 6, output valve 38 and injection pump 5 to be just above or just below the reference pressure.

The most simple way of implementing flexible suspension is the illustrated bolt/spring arrangement. Alternative to the arrangement of bolts 21, one threaded rod can be used about which the displacement member 18 can be turned thereby moving towards or away from the housing 15 changing the tension on the springs 20. Yet another alternative is to use an electromagnetic controllable displacement member 18 using the electricity to control tension from the displacement member 18 on the springs 20. In the two alternatives one spring may be used at the center of the displacement member 18.

It should be mentioned that it may be possible to implement an electronic controllable gearing facilitating an adjustment of the spring load of the flexible suspension.

In addition to establishing a feedback signal representing the pressure in the hydraulic fluid chamber 23, the pressure sensor 7 furthermore has a function of overpressure protection. This is because when the diaphragm 13 is in its top position and pressure is still increasing e.g. due to compressor piston 32 has not reached its top position, then this additional volume of hydraulic fluid is pushed into the pressure sensor 7. Here this volume is pushing the piston 17 which again is pushing the displacement member 18 and thereby expanding/increasing the volume in the cylinder 16. By this additional volume, the pressure sensor 7 is able to absorb the additional volume of hydraulic fluid (pressure is absorbed) and a first state overpressure protection is provided.

The principle of this first stage overpressure protection is the same as the principle leading to establishing the feedback signal representing the pressure in the hydraulic fluid chamber 23 during normal operation of the compressor. Hence, during an abnormal operation of the compressor the displacement of the displacement member 18 is still measured and provided to the controller, but now the displacement represents a pressure which is above normal operation pressure.

As mentioned, in addition to the first stage overpressure protection a second stage overpressure protection is also included in the compressor design. The first stage overpressure protection is limited to absorb a fixed amount of hydraulic fluid/pressure which is sufficient to protect the compressor during normal operation. The fixed amount is equal to a pressure which the flexible suspension can absorb. However, in the unlikely event of failure of the compressor control or part, the second state overpressure protection (emergency line 33 and valve 34) is used to relief pressure from the hydraulic fluid chamber 32 by leading the hydraulic fluid to the reservoir 11.

Figure 5:
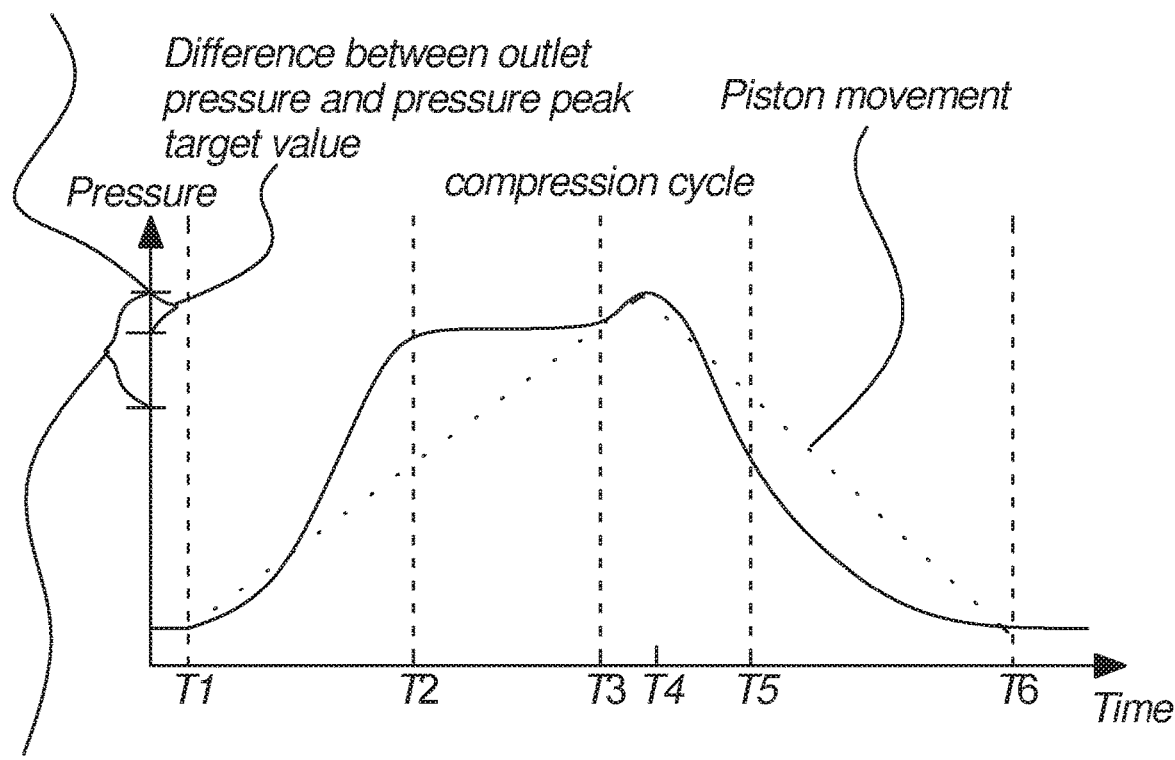
FIG. 5 illustrates a pressure curve of a compression cycle according to an embodiment of the present disclosure.

FIG. 5 illustrates the principles of a compression cycle according to an embodiment of the disclosure. One compression cycle exists between T1 and T6 including one movement up and down of the diaphragm 13. The movement of the compressor piston 32 is illustrated as the dotted line.

Between T1 and T3 the diaphragm 13 is moving up towards the gas chamber 14 thereby pressurizing the gas therein. From T2 the pressure is kept constant by opening the gas outlet 28 thereby discharging the now pressurized gas.

At T3, the gas chamber 14 is empty (at least close to, there might be some gas left in the gas chamber in small voids e.g. in relation the inlet port, etc.) and the pressure continues to increase until the compressor piston 32 is in its top position at T4. As illustrated, the compressor piston 32 moves up from T1 to T4.

In an embodiment, the pressure sensor 7 comprises a displacement member 18 which is moving according to the initial load adjustment of the flexible suspension holding it. In an embodiment, the displacement member 18 is starting to move at a pressure of e.g. 35 MPa and as the pressure increases towards a pressure peak value of e.g. 80 MPa the size of the displacement of the displacement member 18 increases with the pressure increase.

The pressure increases and the displacement of the displacement member is not necessarily linear in that. In the situation of non-linearity, the calculations of pressure of a given displacement is more complex than in the situation of linearity. In practice this may result in the following, if an outlet pressure of the gaseous fluid of 100 MPa is desired, the pressure peak target value may be 110 MPa to ensure measurable displacement of the movement of the displacement member 18. If the desired outlet pressure instead is 50 MPa, the pressure peak target value may be 70 MPa.

At T3 where there is no more gas in the gas chamber 14, the pressure increases again which is measurable as a displacement of the displacement member 18.

Typically, the load adjustment of the flexible suspension first enables measurement of displacement of the displacement member 18 when the pressure in the high-pressure part 1 is more than 50% of the peak pressure target value. At FIG. 5, an example of a desired interval of pressure measured by the pressure sensor 7 is illustrated.

At T4 (referred to as top dead center of the piston 32), the pressure starts to decrease in that the piston 32 starts to move towards the hydraulic fluid chamber 23. The remaining gas in the gas chamber 14 expands, gas is introduced into the gas chamber 14 via the gas inlet 27 until the compression cycle ends at T6 to start over again as described from T1.

As described, the disclosure is advantageous in that it is able to reduce the top dead center pressure and thereby the load and thereby increase the efficiency of the compressor in that no excess hydraulic fluid has to exit the hydraulic distribution plate 22/hydraulic fluid chamber 23. This is obtained by using the feedback from the pressure sensor 7 in the control of the pressure potential established by the injection assembly 3.

The pressure in the high-pressure part 1 is extremely difficult to predict in that it depends on the how much hydraulic fluid is leaking via the compressor piston 32 and the inlet pressure of the gas entering the gas chamber 14, properties with the gas, etc.

Therefore, the peak pressure target value is chosen to be above the desired pressure of the pressurized gas leaving the outlet port 28. The peak pressure target value should be high enough to facilitate movement of the displacement member 18, but still not higher than the hydraulic fluid causing the extra pressure from T3 to T4 can be absorbed by the flexible suspensions. Preferably the peak pressure target value is therefore about 10% higher than the desired pressure of the pressurized gas leaving the outlet port 28. The percentage is of course determined by the dimensions of the pressure sensor 7, cylinder 16 and flexible suspensions. An example of difference between outlet pressure of gaseous fluid and pressure peak target value is illustrated on FIG. 4.

The solution invented to balance the load/efficiency optimization and still be sure to establish the peak pressure is to control the injection assembly 3 based on feedback from the pressure sensor 7. One example for illustration of the control will now be described.

As mentioned, the minimum pressure in the high-pressure part 1 is controlled so that it is equal to or just above the inlet pressure of the gas entering the gas chamber 14. The gas inlet pressure is preferably measure by the pressure sensor 29 and communicated to and used by the controller 8 to establish a pressure reference based on which the injection assembly 3 controls the injection pressure potential. This is to avoid the gas pressure moving the diaphragm towards the bottom of the hydraulic fluid chamber.

It should be mentioned that if for some reason there is too much hydraulic fluid in the hydraulic chamber (and thereby too high gas outlet pressure), then to facilitate a pressure decrease (reduce volume of hydraulic fluid in hydraulic chamber), the valve 6 is controlled (opened) so that the pressure established by the injection pump 5 is just below the reference pressure. Thereby no injection pressure potential is established and thereby no hydraulic fluid is injected into the high-pressure part 1. The pressure in the high-pressure part will then drop by the leakage at the piston 32.

Just as long as the pressure established by/in the injection assembly 3 is below the reference pressure no hydraulic fluid is injected into the high-pressure part 1. How much below doesn't matter.

In an example the gas inlet pressure is 20 MPa and used as pressure reference (0 reference) for the injection potential controlled via the injection assembly 3. Hence a first purpose of the injection assembly 3 is ensuring that the diaphragm do not contact the bottom of the hydraulic fluid chamber 23.

The pressure reference of 20 MPa is in the controller 8 linked to a size of displacement of the displacement member 18 which in this example could be $\frac{1}{100}$ of a millimeter. Accordingly, if the size of displacement measured by the pressure sensor 7 at T1/T6 is less than $\frac{1}{100}$ of a millimeter the controller 8 via the injection assembly 3 increases the potential of injection of hydraulic fluid.

A second purpose of the injection assembly 3 is the inject hydraulic fluid in the high-pressure part 1 to increase/control the pressure peak value.

The maximum pressure in the high-pressure part 1 is controlled as close as possible to peak at a peak pressure target value. The peak pressure target value is determined to be e.g. 5%-15% higher than the pressure of the gas leaving the gas chamber. The pressure in the high-pressure part 1 is controlled as follows.

The injection pump 5 is preferably running continuously in each compression cycle to compensate for the leaking hydraulic fluid at the compressor piston 32 and for changes in the gas inlet pressure or outlet pressure. The amount of hydraulic fluid needed is however as mentioned very difficult to predict. The present disclosure suggests using movement of the displacement member 18 to solve this problem.

Hence, as an example if a displacement of 0.1 mm is measured at a pressure of 100 MPa, then a measurement of 0.05 mm represents a pressure of 50 MPa, etc. If the pressure peak target value is determined to be 50 MPa and a measurement of less than 0.05 mm is measured, then the injection assembly 3 is controlled to increase the injection pressure potential.

Accordingly, during the part of the compression cycle where the output valve 38 is closed and the valve 6 is controlled (preferably closed or at least partly closed) to reduce the amount of hydraulic fluid which is possible to flow through the return path 10. Thereby, an injection pressure potential is established in the hydraulic flow path between the valve 6, injection pump 5 and output valve 38 (i.e. in the injection assembly 3). In this part of the hydraulic flow path, a pressure higher than the inlet pressure is then established which eventually will open the output valve 38 and via pressure equalization hydraulic fluid will be injected to the high-pressure part 1. The volume of the amount of injected hydraulic fluid will then increase the pressure peak value, if not enough to displace the displacement member at least 0.05 mm the valve 6 is kept closed for one more cycle and so on until the measurement of 0.05 mm representing a pressure of 50 Mpa has been measured.

As understood the inventive control is dynamic and is preferably adjusting the amount of hydraulic fluid in each compression cycle to optimize the peak pressure in the high-pressure part of the hydraulic system of the diaphragm compressor.

In the same way if e.g. gas inlet pressure decreases, to ensure the diaphragm continues to allow as much gas in the gas chamber as desired, the injection assembly 3 may be controlled to reduce pressure/amount of hydraulic fluid in the high-pressure part 1 by opening (or at least partly opening) the valve 6.

Preferably, the piston 17 and displacement member 18 are two independent components, however with this said it should be mentioned, that they may be made from one piece of material.

As is now clear from the above description that the peak pressure value of the hydraulic fluid is measured by displacement of the displacement member 18 of a pressure sensor 7. In relation to a desired peak pressure target value, if the peak pressure value is insufficient, this is measured by an insufficient displacement of the displacement member 18 and the injection potential is increased i.e. the injection pressure established by the injection assembly 3 is increased. In the same way in relation to the desired peak pressure target value, if peak pressure value is too high, this is measured by an excessive displacement of the displacement member 18 and the injection potential is reduced i.e. the injection pressure established by the injection assembly 3 is reduced.

As understood from the above description, the disclosure enables a control of the peak pressure in the hydraulic system by only adding a small amount of hydraulic fluid to the hydraulic system more specific to the high-pressure part 1 hereof. As mentioned in the ideal high-pressure compressor 2 only leakage between low and high-pressure part 1, 4 is via the compressor piston 32. Accordingly, the amount (also referred to as volume) of leaked hydraulic fluid is very small hence to maintain balance between desired pressure and leaked hydraulic fluid only an equal amount of hydraulic fluid requires to be added. If on the other hand the pressure needs to be increased, only a small amount (measured in milliliters or drops) more than the leaked amount needs to be added.

The pressure sensor 7 preferably does not measure pressure of the hydraulic fluid directly but instead measures volume of the hydraulic fluid. Since the hydraulic fluid is incompressible when exposed to a pressure, the volume stays the same. This leads to displacement of the displacement member 18 of the pressure sensor 7 since it is in fluidly communication with the high-pressure part 1. During test and calibration, a given displacement is linked to a given pressure and in this way by observing the displacement the pressure of the hydraulic fluid is established.

A further advantage of the present disclosure is that because the amount of injected hydraulic fluid is controlled, it is possible to determine the amount of hydraulic fluid leaking via the compressor piston 32. This information may be used to determine state of health of at least the piston and piston seals. When the injected amount of hydraulic fluid (compensated for change in inlet/output pressure) is monitored over time, at least a tendency of increase injection of maintain a giver pressure can be established. Such increase may indicate that the seals maybe are damaged or defect. The latte may be observed if the tendency of the amount of hydraulic fluid injected starts to increase with a steeper slope.

The above described method of controlling the peak pressure of the hydraulic fluid enables a wider range of operation speeds compared to know injection systems for compressor.

As an alternative to the above described pressure sensor 7 it might be possible to implement a valve in the conduit 41 which is controlling the pump 5 establishing the pressure in the hydraulic pressure chamber. The valve controls the pump so that it is increasing pressure and when the pressure in the chamber 23 is at the desired pressure, the valve change position (terminate flow) and stop the motor?

It is now clear from the above, that in an embodiment the present disclosure relates to a compressor having a pressure sensor 7 measuring pressure in the hydraulic fluid chamber 23 and therefore no need of a return path from the hydraulic fluid chamber to the hydraulic fluid reservoir. Further, the disclosure relates to a method of controlling the pressure in the hydraulic fluid chamber by means of the injection assembly/pump assembly. Preferably the control is based on measurements obtained from the pressure sensor. Further, the disclosure relates to hydraulic refueling station including a compressor and control method as described above.

The invention claimed is:

1. A method of controlling pressure of a hydraulic fluid in a hydraulic fluid chamber of a high-pressure compressor, comprising:

increasing the pressure of the hydraulic fluid in the hydraulic fluid chamber towards a desired compressor start-up pressure, and controlling the pressure increase of the hydraulic fluid in the hydraulic fluid chamber by a control element and a hydraulic injection pump assembly wherein the pressure increase is performed while the compressor is not in operation, wherein the method further comprises establishing a representation of pressure of a fluid in a gas chamber of the compressor, and wherein the desired start-up pressure is determined as a pressure not above the pressure of the fluid in the gas chamber.

2. The method according to claim 1, wherein the method further comprising the steps of:

establishing a representation of pressure of the hydraulic fluid in the hydraulic fluid chamber of the hydraulic system, determining a desired start-up pressure of the hydraulic fluid in the hydraulic fluid chamber, comparing the pressure of the hydraulic fluid in the hydraulic fluid chamber and the desired start-up pressure by the control element, and terminating a pressure increase within the hydraulic fluid chamber when the pressure of the hydraulic fluid chamber reaches the desired start-up pressure.

3. The method according to claim 1 wherein the method further comprising the step of starting the compressor after the pressure of the hydraulic fluid in the hydraulic fluid chamber has reached the desired start-up pressure.

4. The method according to claim 1, wherein the hydraulic injection pump assembly comprises an electric pump pumping hydraulic fluid from a hydraulic fluid reservoir via a conduit to the hydraulic fluid chamber.

5. The method according to claim 1, wherein the hydraulic injection pump assembly, forming part of a hydraulic fluid path between a low-pressure part of the hydraulic system and a high-pressure part, pumping the hydraulic fluid from the fluid reservoir to the hydraulic fluid chamber comprises:

an output valve a valve, and an injection pump establishing a flow of hydraulic fluid from the low-pressure part to the high-pressure part when the output valve is open, and a pressure sensor establishing a feedback signal representing the pressure in the high-pressure part, wherein the injection pump establishing a pressure potential of injection of hydraulic fluid when the valve is closed and when the output valve is closed, and wherein the control element is controlling the pressure potential of injection of hydraulic fluid into the high-pressure part by control of the hydrogen injection pump assembly based on the feedback signal and a hydraulic fluid peak pressure target value of a desired pressure of hydraulic fluid in the high-pressure part.

6. The method according to claim 1, wherein the pressure potential of injection of hydraulic fluid is established in the hydraulic injection pump assembly.

7. The method according to claim 5, wherein an amount of hydraulic fluid injected into the high-pressure part in a compression cycle is determined by the established potential of injection of hydraulic fluid, wherein the potential of injection of hydraulic fluid is controlled by controlling the valve based on the pressure difference between the pressure represented by the feedback signal and the peak pressure target value.

8. The method according to claim 1, wherein the pressure is increased during a plurality of compression cycles following the compression cycle during which the feedback signal representing the pressure of the high-pressure part was below the peak pressure target value.

9. The method according to claim 5, wherein the feedback signal representing the pressure in the high-pressure part is measured in each compression cycle.

10. The method according to claim 5, wherein the control element is controlling the potential of injection of hydraulic fluid so that the pressure in the high-pressure part is always above a reference potential which is equal to or higher than an inlet pressure of the gas.

11. The method according to claim 5, wherein the feedback signal is established by a pressure sensor comprising a housing mounted to the high-pressure part in which a cylinder with a piston in fluidly connection with the hydraulic fluid of the high-pressure part is located, a displacement member and a displacement sensor wherein the pressure of the hydraulic fluid in the high-pressure part is physically displacing a displacement member and wherein the size of the displacement is measured by a displacement sensor.

12. The method according to claim 1, wherein the desired start-up pressure is determined between 50-75% of the pressure of the fluid in the gas chamber.

13. The method according to claim 1, wherein a desired volume increase of the hydraulic fluid in the hydraulic fluid chamber is established by introducing between 0.1 and 10 milliliters of hydraulic fluid into the hydraulic fluid chamber before starting the compressor.

14. The method according to claim 1, wherein the pressure of the hydraulic fluid in the hydraulic fluid chamber is established by a pressure sensor in fluid communication with the hydraulic fluid chamber.

15. The method of controlling the high pressure compressor according to claim 1, wherein the compressor is a two-stage compressor having a head configured to establish a first pressure and a second head configured to establish a second pressure, wherein the second pressure is higher than the first pressure.

* * * * *